May 30, 1944.  M. BEAN  2,349,806
MOLDING PATTERN
Filed Aug. 1, 1940  2 Sheets-Sheet 1

INVENTOR
Morris Bean.
BY
ATTORNEY

May 30, 1944.  M. BEAN  2,349,806
MOLDING PATTERN
Filed Aug. 1, 1940  2 Sheets-Sheet 2

INVENTOR
Morris Bean
BY
ATTORNEY

Patented May 30, 1944

2,349,806

UNITED STATES PATENT OFFICE 2,349,806

MOLDING PATTERN

Morris Bean, Yellow Springs, Ohio

Application August 1, 1940, Serial No. 349,032

8 Claims. (Cl. 18—34)

This invention relates to patterns for use in molding of plaster and the like.

For a long time, in the art of molding, the advantages of using a flexible material for a pattern or mold have been recognized. Such flexible material can be pulled away from undercut places without damage either to itself or the material molded against it, or to the material it is molded in, as the case may be. Hence, complex forms or shapes can be made from a single pattern or mold, where a complex pattern or mold of many parts would have to be used if it were made of a rigid material.

The advantages to be gained in the use of flexible patterns are of particular interest for making molds bonded with plaster of Paris. It is a well known fact that mold materials containing a substantial proportion of plaster of Paris can be gauged with water and made to flow in around the pattern as a fluid plastic, which will subsequently "set" within a short space of time to a rigid solid having high strength and resistance to disintegration from mechanical abrasion.

There are, however, some obvious disadvantages connected with the use of flexible patterns or molds in some applications. It is apparent that a material pliable enough to offer distinct advantages in molding is also pliable enough so that it may not hold its shape within close limits of variation. In making a series of casts, the pattern or mold may not rest in exactly the same position twice, it may warp as internal strains tend to neutralize, or it may shrink on account of the volatilization of some of the ingredients.

It is accordingly an object of my invention to overcome these disadvantages and to provide a pattern structure which is adapted to reproduce form and dimensions accurately in a large number of casts made upon it. Another object of the invention is to produce such a pattern which will be capable of long life and repeated re-use.

Other objects and advantages will be apparent to those skilled in the art from the following specification.

I have overcome the difficulties set forth above by a number of expedients which advantageously are used together, but many of which may be used independently with improvement over patterns known prior to my invention. According to my invention, a pattern formed of a flexible resilient material is permanently attached to a rigid support which is fitted to the back of the pattern. The result of this is a flexible pattern held firmly and accurately against the rigid piece of material so that it always returns to the same shape. The necessary flexibility and resiliency is attained in the thickness of the material which is designed with this end in view, whereas, if the material is not made too thick between the back and the molding surface, the body of the pattern is held sufficiently rigid so that it will remain accurate, even in minute detail of its surface, when a soft or fluid mix of plaster or the like is poured over it and allowed to set.

I have found, however, with patterns of this kind, that, unless special precautions are taken, changes in size and changes in shape by warping, etc., and changes in degree of flexibility may occur over a period of time due to loss of certain ingredients, particularly plasticizers, contained in the material of which the pattern is made. I have found that this loss is most serious when the pattern is backed with a rigid stone-like material such as plaster of Paris or cement; and I have found that this is due to the capillary action of the porous material used for the backing. Inasmuch as plaster, cast over the back of the pattern, makes an ideal backing material in other respects, this has proven to be a serious disadvantage.

I have now overcome this disadvantage by coating the back of the pattern with a material which is impervious to the plasticizer or other fugitive ingredients. For this purpose I have used, for example, various waxes, including for example, paraffin, various lacquers and resins, including for example, shellac, vitreous materials, such for example as water glass, and thin sheet materials, particularly metal foils.

Finally, I have found that there is great difference in the ability of flexible resilient materials to withstand the various conditions to which they are subjected in use as patterns for molding plaster and the like; and I have found great advantage in the use of a particular material not heretofore used for this purpose, known as "Korogel" or "Koroseal," available commercially under these names from the B. F. Goodrich Rubber Company. This is understood to be a vinyl chloride gel plasticized with a cresyl phosphate, which is more particularly described in the Journal of Industrial and Engineering Chemistry, vol. 27, June, 1935, pages 667 to 672. Other resiliently elastic thermoplastic materials may be used, however. Soft rubber, with or without vulcanizing, may be used. The various synthetic rubber-like materials including, for example, "Duprene," "Thiokol," and various polymerization products.

I have found in the production of patterns from this and other thermo-plastic materials that there is a relatively high contraction of the material after it is injected into the mold and while it is cooling, and that this tends to draw the material away from the surface which is to be reproduced by the pattern with formation of objectionable irregularities on the pattern surface. This I have now been able to overcome by treating the respective surfaces of the mold so that the thermo-plastic material adheres more strongly to the surface which is to be reproduced than to the back of the mold in which it is formed. Thus I may coat the face of the mold to increase the adhesion, provided that it is not increased in such a way that the pattern cannot subsequently be removed from the mold; or, more advantageously, I may treat the back of the mold so as to permit the material on contracting to draw readily away from the back and thus to exert little or no retractile force on the surface which is to be molded. Advantageously, I treat the surface which is to be reproduced by a material which facilitates removal but to which the thermo-plastic material adheres substantially.

When the face of the mold is made of a porous material such as plaster composition, I have found it particularly advantageous to use impregnation of the mold face with a hard wax, such as montan wax, and advantageously a partially refined montan wax, e. g., a mixture of 50% refined and 50% unrefined, or the surface may be impregnated with a solution of a phenolic condensation resin or other suitable hard resin. The material chosen for this purpose is one which impregnates and flows easily at a temperature which does not dehydrate the plaster; advantageously, as in the case of montan wax, it is one which deters dehydration of the plaster by the hot thermo-plastic molded upon it; it should be a material the excess of which can be easily wiped off the surface of the plaster to leave a clean, smooth face; it should not soften at the temperature reached when the hot thermoplastic is molded on its surface; it should not adhere to the thermo-plastic so strongly as to make difficulty in stripping off the molded thermo-plastic; and its contraction on solidification and/or cooling should be sufficiently low so that it does leave voids.

For the back I have found most suitable a thin metal foil to which the thermo-plastic may adhere but which flexes easily away from the back of the mold, or I may dust the back of the mold with talc, or graphite, or may treat it with an insoluble soap or other material to which the thermo-plastic does not readily adhere.

In making a Korogel pattern, the following general procedure is to be followed:

The Korogel is heated to a temperature sufficiently high so that it becomes fluid and is poured or otherwise injected into the mold cavity between these treated surfaces and then allowed to cool. During the cooling and solidification of the Korogel there is relatively large contraction, which due to the treatment of the mold surfaces is accommodated entirely at the back of the mold, since the Korogel material is held more strongly at the face than at the back; and as a consequence the Korogel remains molded accurately to every fine detail of the face of the mold.

After the Korogel is solidified, the mold may be opened by removing the back, i. e., the part treated for lesser adhesion. The resulting pattern may thereafter be stripped from the face without injury, due to the mild adhesion between the Korogel and the wax impregnated surface. Advantageously, however, it is left in this mold until the rigid back is applied and set.

If a metal foil has been used in the mold as a means of reducing the hold of the Korogel on the back of the mold, this may be stripped off or left on the back of the pattern, and in the latter case will serve as a barrier against fugitive ingredients which might otherwise be absorbed out of the Korogel or other thermo-plastic composition into the plaster backing by capillary action.

If foil is not left on the back or has not been used during the molding operation it is desirable at this stage to apply a coating of some material which will serve as a barrier against loss of fugitive ingredients. For this purpose I have found a coating of paraffin or other wax to be suitable.

I then apply anchor means, distributed over substantially the entire area of the back. These are preferably metallic members which are heated so as to partially embed themselves in the thermo-plastic body but to leave parts projecting which are later embedded in the material which forms the back. For this purpose wire coils have proven to be best adapted, since the opposite halves of the turns of the coil form loops which embed themselves completely in the thermoplastic and the backing material respectively, giving thus closely spaced anchoring means with a minimum of labor in their application. If desired, the heating may be supplied uniformly throughout the coil by passing an electric resistance current through the entire coil after it has been laid in position on the back of the plastic pattern. In some cases I have found it advantageous to apply the anchoring means before applying the coating to seal fugitive ingredients.

With such anchoring means secured to the back of the pattern, I then cast over this a body of plaster or other material which forms a substantially rigid back. This material flows in and around the loops of the wire coil or other anchoring means and give a secure engagement between the flexible pattern and the rigid back. The flexible pattern, rigid back attached, is then removed from the front part of the mold.

The resulting pattern with its rigid back is now in condition for use in molding plaster, and the like, especially with plasters which are in substantially fluid condition so that they form easily about the surfaces of the flexible pattern without imposing stresses which would tend to distort the pattern. I have found that molded articles may be successively formed on a single pattern in large numbers and all will accurately reproduce the same surface form and dimensions.

My invention is applicable as well to molds for making positives as to patterns for making negative impressions for molding positives. The difference is essentially one of design of the product and use which does not fundamentally affect the operation of this invention. I shall, therefore, use the word "pattern" to include both types without reference to the technical distinction between "patterns" and "molds." It should be remembered, however, that a molding technique is used in making these flexible patterns. The mold used in making a pattern out of a thermoplastic material is not to be confused in this discussion with such flexible molds herein referred to as "patterns" or with molds which may be made from the pattern after it is finished.

Although in the accompanying drawings I have shown a preferred embodiment of my invention and have described the same and various modifications thereof in this specification, it is to be understood that these are not intended to be either exhaustive or limiting of the invention, but on the contrary are chosen for the purposes of illustrating the invention in order that others skilled in the art may so fully understand the invention, its principles and the application thereof, that they may embody it and adapt it in numerous forms, each as may be best suited to the requirements of its particular use.

Referring to these drawings.

Figure 1:
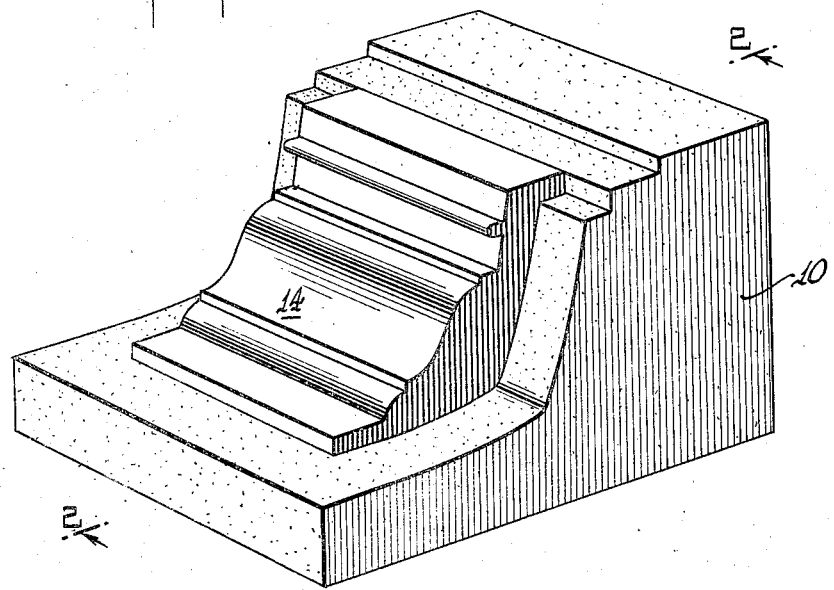
Fig. 1 is a perspective view of the pattern with its rigid back.
Figure 2:
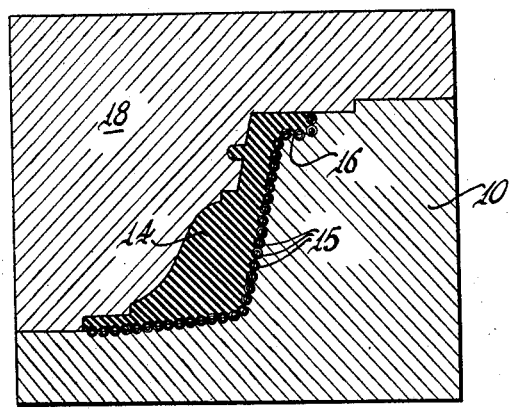
Fig. 2 is a cross section of the same, with a plaster body molded on the pattern.

In Figs. 1 and 2, I have shown a finished pattern assembled on its rigid backing which constitutes together with a pattern for molding plaster and the like, e. g., in the manufacture of plaster molds for metal casting. The rigid backing shown at 10 is, in the preferred case, made of plaster, cast in situ onto the back of the flexible pattern 14, which, as already stated above, in the preferred case, is composed of Korogel. At 15, I have shown the wire coils, mentioned above, by which the pattern 14 is anchored to the rigid backing 10, and at 16 between the backing 10 and the pattern 14 is a layer of impervious material, advantageously paraffin wax.

The plaster body 18 is made by pouring the plaster over the pattern 14, as is well known in connection with ordinary plaster molding technic. When the plaster has set and the molding is, therefore, complete, the flexible pattern 14 is readily stripped from the molded article by reason of its smooth surface and its resilient flexibility, whereas, it is held securely to the rigid backing 10 by means of the anchoring coils 15; and, by reason of the distribution of these coils, the stripping of the flexible material from the mold takes place without any concentration of the stresses which might tear or permanently deform the flexible pattern.

Figure 3:
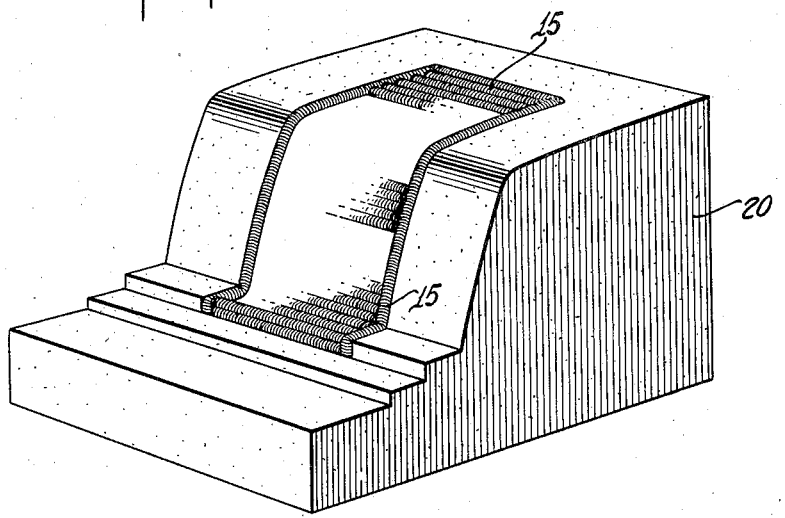
Fig. 3 is a perspective view of the back of the flexible pattern still in place on the negative impression mold and with the anchoring coils affixed in the back of the pattern ready for application of the hardenable backing material.
Figure 4:
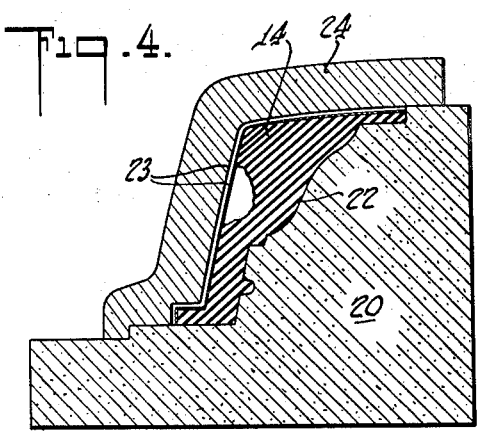
Fig. 4 is a view in cross section similar to Fig. 2 showing the negative impression mold in which the pattern is formed.

In Figs. 3 and 4, I have shown the pattern and certain steps and apparatus used in its manufacture. Fig. 4 shows the mold in which the thermo-plastic is formed and given the desired pattern surface. In this I have used a negative impression mold 20, which may be modeled or carved in plaster, clay, hard wax, wood or other suitable material, or may be shaped by molding directly onto a surface which is to be reproduced in the pattern, for example, a plaster cast of the original. The surface of this mold, particularly if a porous material such as plaster is used, is preferably impregnated with a high melting point wax, such as montan wax, advantageously a partially refined montan wax, or a phenol-formaldehyde condensation resin such as Bakelite varnish may be used satisfactorily, to give a mold adhesion at the pattern face sufficient to prevent the Korogel from drawing away from the pattern face while it is congealing and yet adapted readily to be freed from the Korogel after it has congealed.

Other coatings or lubricating materials can be used on the face of the pattern mold instead of the wax or varnish; for example, the molds may be dusted with graphite, talc or bronzing powder, but always the treatment of this mold face at 22 is to be so related to the treatment of the face (at 23) of the back 24 as to have a substantially greater adhesion to the thermo-plastic molded in the cavity.

To this end, I preferably cover the back surface (at 23) of the cavity, away from the molding face 22, with a metal foil 23 which is free to pull away from the mold face proper and thus to accommodate the entire shrinkage of the thermo-plastic at the surface thus covered with foil. Other coatings than foil may be used for this purpose also. For example, a heavy coating of lubricating material such as graphite, talc or bronzing powder, may be used provided always that the adhesion at the molding face 22 is kept stronger than the adhesion at the face 23 where contraction is to be concentrated.

With the mold parts assembled, as shown in Fig. 4, the hot fluid thermo-plastic is poured or otherwise injected into the mold, preferably under a substantial pressure, and is allowed to congeal and cool in the mold. After cooling the pattern is stripped from the mold and is then provided with the anchoring means in the manner illustrated in Fig. 3.

In Fig. 3, I have shown the completed flexible portion of the pattern with coils of wire 15 laid over its back and distributed over substantially the entire area of the back. These coils are then heated, for example, by pressing with a hot plate, by passing a resistance electrical current through them or by means of a fine Bunsen flame or otherwise, until a part of each turn is embedded in the thermo-plastic material; but leaving a part of these turns projecting from the back, as shown for example in Fig. 3, and the turns spaced for a plaster key.

Either before or after the application of the coils 15 an impervious coating may be applied to the back. If the metal foil has been used in the mold it may be left in position, but may make difficulty in applying the coils 15 unless the surfaces of the coil are sufficiently rough or sharp to puncture the foil or the foil is otherwise ruptured at the point where the coil contacts.

The pattern with these anchoring coils 15 and the impervious backing 16 is ready for application of the rigid backing 10. This I do preferably by placing the pattern thus prepared face down in a suitable mold and casting a plaster mix onto its back, thus forming in situ the rigid backing by which the flexible pattern is supported throughout its use. The plaster mix or other plastic used for this purpose should be sufficiently fluid to flow around the wires of the coils 15 or other anchoring means or should be tamped lightly to force it around the anchoring means but at the same time to avoid distortion of the pattern.

When the backing has set the pattern with its backing keyed thereto throughout its area may be removed from the mold and is ready for use.

Figure 5:
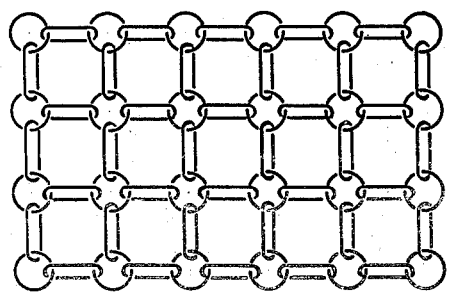
Fig. 5 is a plan view showing a chain link fabric which may be used instead of the wire coils.

In Fig. 5, I have shown another example of an anchoring means suitable for use in my invention. This is a chain mail fabric, which can be partially embedded in the thermo-plastic and the backing in the same way as the wire coils already described. It has the advantage that it can be cut to the size and shape of the back of the mold, laid over it and heated to embed itself in the mold all with somewhat less labor than with the coils.

In my copending applications, Serial Numbers 487,527 and 487,528, filed May 18, 1943, I have claimed the inventions divided from this application including particularly the anchoring of the pattern to the rigid back by wire coils and the use of foil or other releasing agent to concentrate shrinkage of the pattern material at the back rather than at the molding face.

What I claim is:

1. A pattern for molding plaster and the like which comprises a resiliently flexible body of plasticized vinyl chloride gel having its face a negative of the surface which is to be molded thereby, a rigid back of porous substantially rigid material, a layer between said flexible body and said back which is impervious to the plasticizing constituent of said vinyl chloride gel; and anchor means embedded partially in said flexible body and partially in said back and distributed over the area common to said flexible body and the back.

2. A pattern for molding plaster and the like which comprises a resiliently flexible body of plasticized vinyl chloride gel having its face a negative of the surface which is to be molded in the plaster, a rigid back of porous substantially rigid material, and a layer between said flexible body and said back which is impervious to the plasticizing constituent of said vinyl chloride gel.

3. A pattern for molding plaster and the like which comprises a resiliently flexible body of plasticized vinyl chloride gel having its face a negative of the surface which is to be molded in the plaster, a rigid back of cementitious material, and reticulate anchor means embedded partially in said flexible body and partially in said back and distributed over substantially the entire area common to said flexible body and the back.

4. A molding pattern which comprises a flexible resilient pattern element of a composition including a fugitive ingredient, a substantially rigid backing of a porous material, and an intermediate layer of material impervious to said fugitive ingredient.

5. A molding pattern which comprises a substantially rigid back of cementitious material, closely spaced anchor members rigidly embedded in said back and projecting therefrom distributed over the area of the pattern back, and a body of resiliently flexible thermo-plastic material fitted to said back and embedding the projecting portions of said anchor members and having its surface away from said back shaped in the desired pattern which is to be reproduced by molding therewith.

6. A molding pattern which comprises a substantially rigid back, anchor members comprising spaced loops rigidly embedded in said back and projected therefrom, distributed over the area of the pattern back, and a body of resiliently flexible material fitted to said back and embedding the projecting portions of said anchor members and having its surface away from said back shaped in the desired pattern which is to be reproduced by molding therewith.

7. A molding pattern which comprises a substantially rigid back, wire coils having the loops thereof spaced and rigidly embedded in said back and projecting therefrom distributed over the area of the pattern back, and a body of resiliently flexible material fitted to said back and embedding the projecting portions of said wire coils and having its surface away from said back shaped in the desired pattern which is to be reproduced by molding therewith.

8. A molding pattern which comprises a back of plaster of Paris, anchor means partly embedded in said plaster back and projecting therefrom, a coating of wax on the surface of the back which carries said anchor means and adapted to seal said surface against the capillary effect of the plaster, a body of resiliently flexible vinyl chloride-tricresyl phosphate gel fitted to said back, embedding the projecting portions of said anchor means and shaped to the desired pattern.

MORRIS BEAN.